G. B. Howland,
Gate Latch,
N° 76,918.    Patented Apr. 21, 1868.

Witnesses:
S. D. Underwood
G. W. Putnam

Inventor:
George B. Howland

United States Patent Office.

GEORGE B. HOWLAND, OF GARDNER, ILLINOIS.

Letters Patent No. 76,918, dated April 21, 1868.

IMPROVEMENT IN GATE-LATCHES.

The Schedule referred to in these Letters Patent and making part of the same.

TO ALL WHOM IT MAY CONCERN:

Be it known that I, GEORGE B. HOWLAND, of Gardner, in the county of Grundy, and State of Illinois, have invented a new and improved Gate-Fastening; and I do hereby declare that the following is a full and exact description thereof, reference being had to the accompanying drawings, and to the letters of reference marked thereon.

The nature of my invention consists in such a construction of the fastenings as will permit the employment of drop-latches without incurring the necessity of a spring, or any unnecessary weight of iron, in connection with the bar or stop, on the gate itself, which object I believe can only be effected (in case of self-closing gates swinging both ways with reliable fastenings) by such a construction as will leave the space directly above the fastenings unobstructed, so that, in opening the gate, the bar on the gate may pass directly over the fastenings.

To enable others to make and use my invention, I will proceed to describe its construction and operation.

Figure 1:
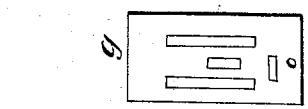
Figure 1:
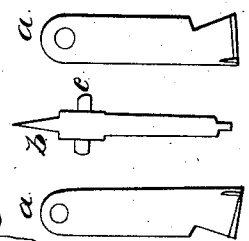

In its construction, I use four pieces of iron, as shown at Figure 1, in the accompanying drawings. $a\ a$ represent the drop-latches; $b$, the middle piece or bat, to which are attached the latches, fastened by washers and rivet at $c$, as shown in Figure 2, which figure shows its position when in use.

Figure 3:
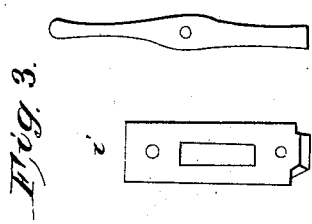
Figure 2:
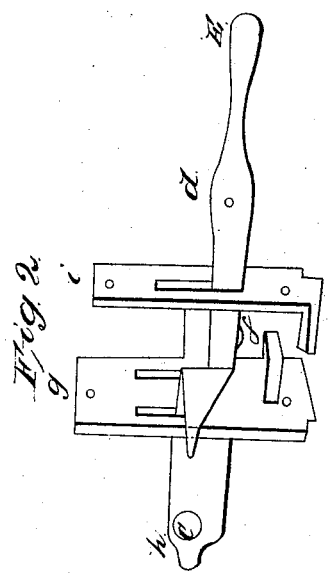

Figure 3 represents the bar or stop (with its accompanying plate $i$) on the gate, which rests on a fulcrum at $d$, fig. 2, and is operated by a gentle downward pressure on the small end, $e$, causing the opposite end, $f$, to rise above the latches.

The fastenings are attached to the gate-post by inserting them into an auger-hole made to a depth equal to the distance between the plate $g$, fig. 2, and the letter $h$, and gently driving on the middle piece $b$ until the plate $g$ comes in contact with the surface of the post, when screws are inserted through the plate $g$.

What I claim as my invention, and desire to secure by Letters Patent, is—

The peculiar construction of the drop-latches, and their attachment to the middle piece $b$, as shown in fig. 2, thereby securing an unobstructed space immediately above the latches, so that the gate may be opened, as herein described, without necessarily involving a spring or unnecessary weight of iron, in connection with the bar or stop on the gate, either of which is more expensive and inconvenient to operate.

GEO. B. HOWLAND.

Witnesses:
GEORGE W. MILNER,
S. D. UNDERWOOD.